(12) United States Patent
Hong et al.

(10) Patent No.: US 12,592,434 B2
(45) Date of Patent: Mar. 31, 2026

(54) APPARATUS AND METHOD FOR SHAPING POUCH FILM FOR SECONDARY BATTERIES

(71) Applicant: LG Energy Solution, Ltd., Seoul (KR)

(72) Inventors: Jeong Woo Hong, Daejeon (KR); Sang Wook Kim, Daejeon (KR); Sung Chul Park, Daejeon (KR); Dong Hyeuk Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 622 days.

(21) Appl. No.: 17/763,389

(22) PCT Filed: Oct. 16, 2020

(86) PCT No.: PCT/KR2020/014161
§ 371 (c)(1),
(2) Date: Mar. 24, 2022

(87) PCT Pub. No.: WO2021/080255
PCT Pub. Date: Apr. 29, 2021

(65) Prior Publication Data
US 2022/0367945 A1 Nov. 17, 2022

(30) Foreign Application Priority Data

Oct. 22, 2019 (KR) ........................ 10-2019-0131104

(51) Int. Cl.
| | |
|---|---|
| *H01M 50/105* | (2021.01) |
| *B21D 22/02* | (2006.01) |
| *B21D 37/16* | (2006.01) |
| *H01M 50/124* | (2021.01) |

(52) U.S. Cl.
CPC ........ *H01M 50/105* (2021.01); *B21D 22/022* (2013.01); *B21D 37/16* (2013.01); *H01M 50/124* (2021.01)

(58) Field of Classification Search
CPC .............. H01M 50/105; H01M 50/124; B21D 22/022; B21D 37/16
See application file for complete search history.

(56) References Cited

U.S. PATENT DOCUMENTS

| | | | |
|---|---|---|---|
| 4,390,489 A | 6/1983 | Segal | |
| 6,877,216 B2 | 4/2005 | Fukuda et al. | |
| 2008/0107963 A1 | 5/2008 | Lee et al. | |
| 2012/0258354 A1 | 10/2012 | Yamaguchi et al. | |
| 2016/0340068 A1* | 11/2016 | Brandt Sanz ........ C11D 17/042 |

(Continued)

FOREIGN PATENT DOCUMENTS

| | | |
|---|---|---|
| CN | 102804446 A | 11/2012 |
| CN | 109792034 A | 5/2019 |

(Continued)

OTHER PUBLICATIONS

English translation of KR Publication 102030927, Oct. 2019.*

(Continued)

*Primary Examiner* — Brittany L Raymond
(74) *Attorney, Agent, or Firm* — Lerner David LLP

(57) ABSTRACT

Disclosed are a pouch film shaping apparatus including a preheating lamp configured to preheat a metal barrier layer of a pouch film in order to increase stretching force of the pouch film and a pouch film shaping method.

7 Claims, 5 Drawing Sheets

(56)           References Cited

U.S. PATENT DOCUMENTS

| 2018/0243966 | A1 | 8/2018 | Oh et al. |
| 2019/0229324 | A1 | 7/2019 | Woo et al. |

FOREIGN PATENT DOCUMENTS

| CN | 109817852 | A | | 5/2019 |
| DE | 202011108504 | | * | 3/2013 |
| DE | 202011108504 | U1 | | 3/2013 |
| JP | 2015-123588 | | * | 7/2015 |
| JP | 2018067476 | A | | 4/2018 |
| KR | 20060081371 | A | | 7/2006 |
| KR | 20150037242 | A | | 4/2015 |
| KR | 20150089556 | A | | 8/2015 |
| KR | 101587554 | | * | 1/2016 |
| KR | 101587554 | B1 | | 1/2016 |
| KR | 101623106 | B1 | | 5/2016 |
| KR | 101795711 | B1 | | 11/2017 |
| KR | 101837234 | B1 | | 3/2018 |
| KR | 20180060697 | A | | 6/2018 |
| KR | 101866132 | B1 | | 7/2018 |
| KR | 2018-0092174 | | * | 8/2018 |
| KR | 20180092174 | A | | 8/2018 |
| KR | 101984889 | | * | 5/2019 |
| KR | 101984889 | B1 | | 5/2019 |
| KR | 102030927 | | * | 10/2019 |

OTHER PUBLICATIONS

English translation of JP Publication 2015-123588, Jul. 2015.*
Extended European Search Report including Written Opinion for Application No. 20878181.5 dated Oct. 25, 2022, pp. 1-9.
International Search Report for Application No. PCT/KR2020/014161 mailed Jan. 29, 2021, 2 pages.
European Office Action for Application No. 20878181.5 dated Aug. 30, 2024, pp. 1-6.
Bonten, C. et al., "Welding of Plastics—Introduction Into Heating by Radiation", Journal of Reinforced Plastics and Composites, May 2002; pp. 699-709, vol. 21.
Lee, Jeong-Hoon, "An Experimental Study on the Drying Characteristics of Medium wave Infrared Dryer", Graduate School of Konkuk University, Mechanical Engineering, Feb. 2008, 43 pages. [Providing English Translation of Abstract only].
6. Absorption rate of infrared rays_HEAT-TECH, 4 Pages, [online] URL: https://heater.heat-tech.biz/ko/infrared-panel-heater/science-of-the-infrared-rays/7743.html.

* cited by examiner

【FIG. 1】
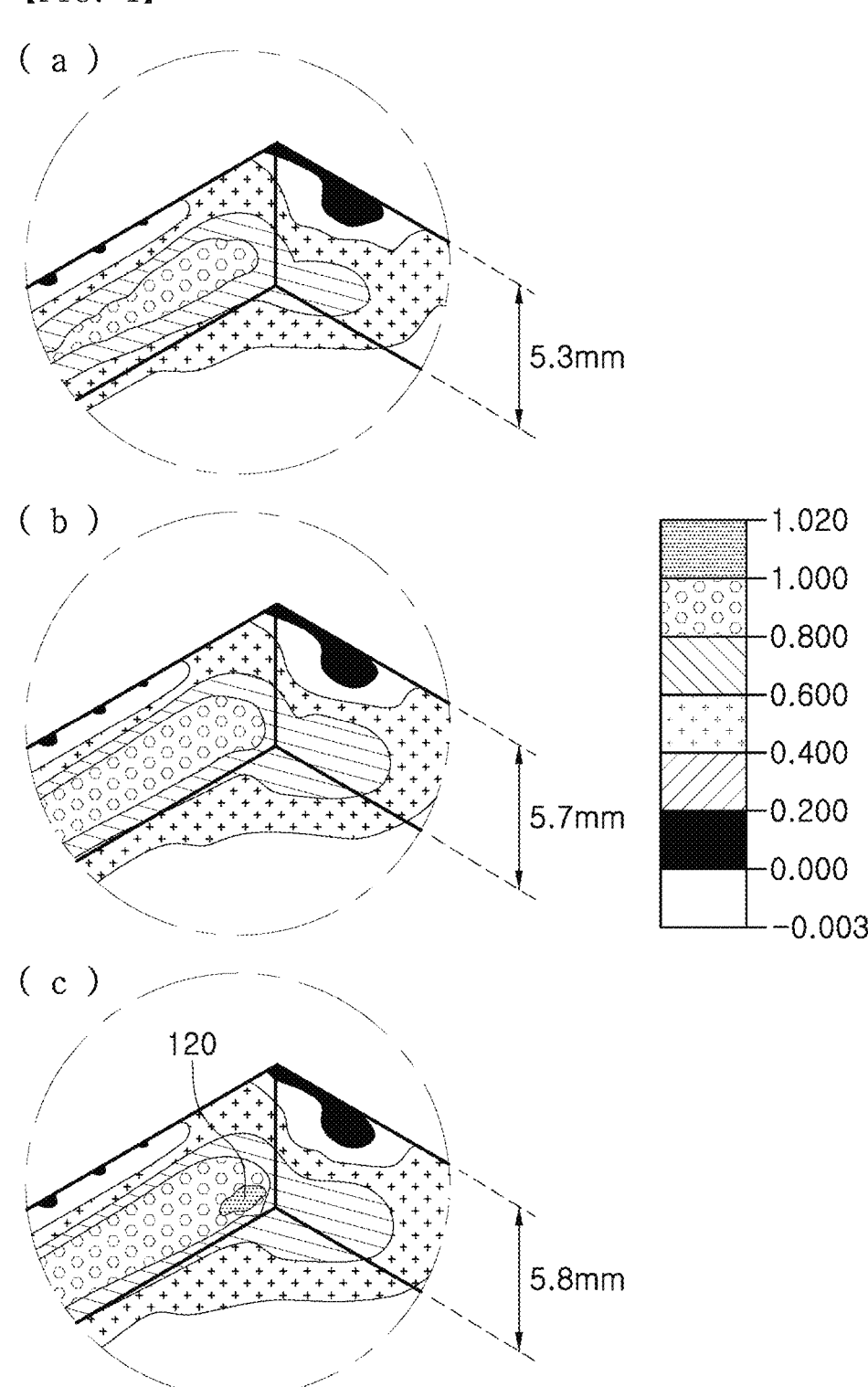

【FIG. 2】
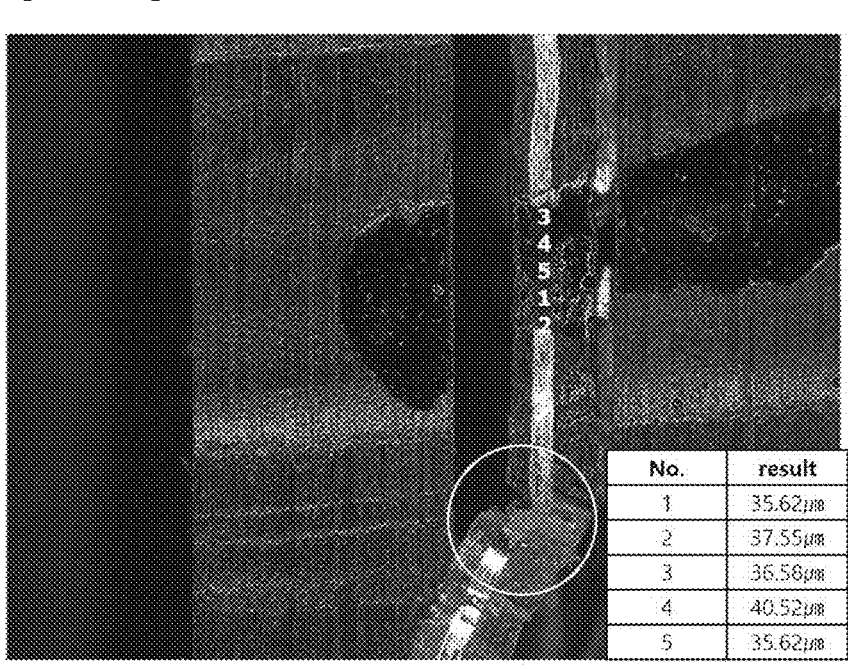
| No. | result |
|-----|--------|
| 1 | 35.62μm |
| 2 | 37.55μm |
| 3 | 36.58μm |
| 4 | 40.52μm |
| 5 | 35.62μm |

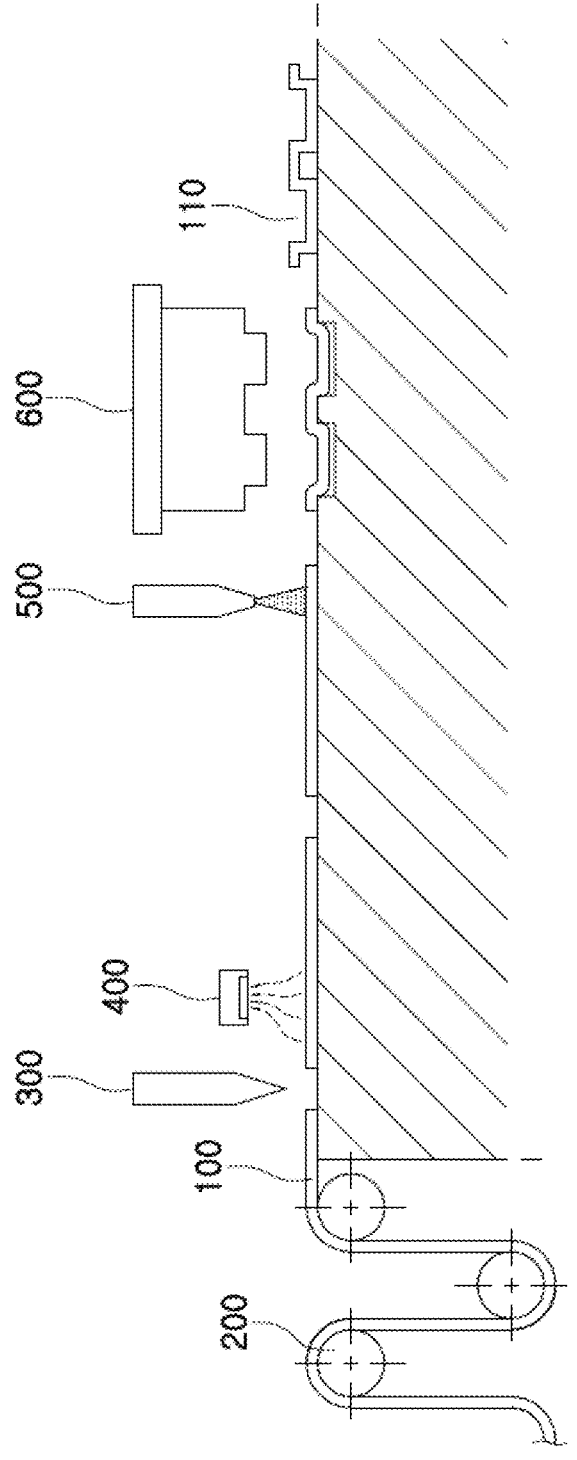
[FIG. 3]

【FIG. 4】
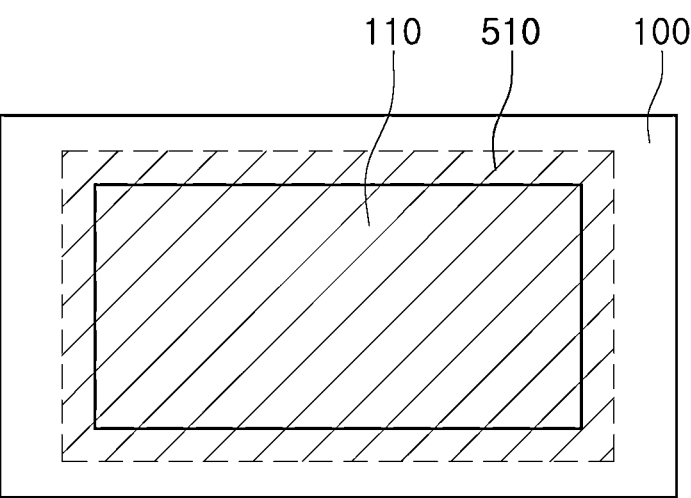

【FIG. 5】
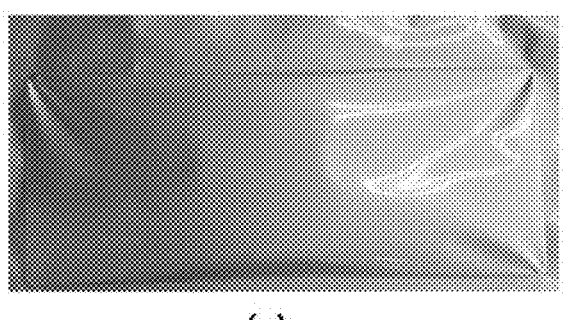
(a)
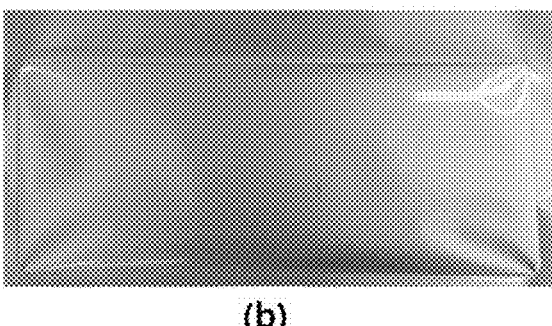
(b)
【FIG. 6】
Al
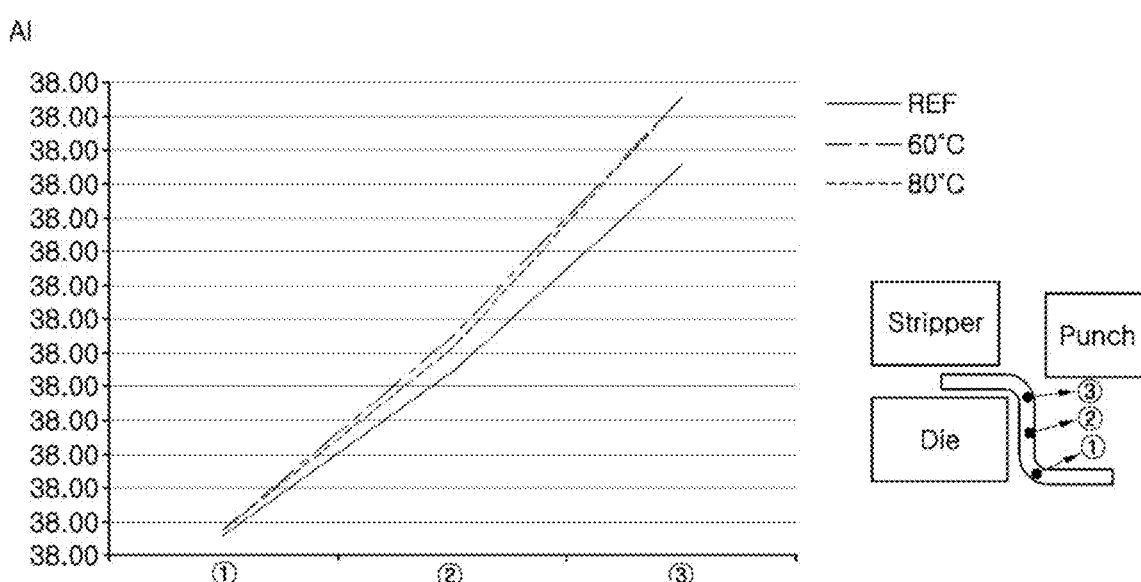

1

APPARATUS AND METHOD FOR SHAPING POUCH FILM FOR SECONDARY BATTERIES

CROSS-REFERENCE TO RELATED APPLICATIONS

This application is a national phase entry under 35 U.S.C. § 371 of International Application No. PCT/KR2020/014161, filed on Oct. 16, 2020, published in Korean, which claims priority to Korean Patent Application No. 10-2019-0131104, filed on Oct. 22, 2019, the disclosures of which is are hereby incorporated by reference herein their entireties.

TECHNICAL FIELD

The present invention relates to a pouch film shaping apparatus and method, and more particularly to a pouch film shaping apparatus and method capable of efficiently heating an aluminum metal barrier layer of a pouch film in order to increase elongation of the pouch film.

BACKGROUND ART

A pouch-shaped battery is generally formed by shaping an aluminum laminate sheet and receiving an electrode assembly in the shaped aluminum laminate sheet. Since the aluminum laminate sheet is easily deformable, it is possible to manufacture the aluminum laminate sheet in various forms. In addition, since the aluminum laminate sheet is lightweight, it is possible to increase energy density per unit weight of the pouch-shaped battery.

In recent years, the demand for high-capacity, high-density batteries has increased with diversification of devices that use batteries. For the pouch-shaped battery, electrode assemblies may be further received in the pouch-shaped battery or the thickness of the aluminum laminate sheet may be reduced in order to obtain a high-capacity, high-density pouch-shaped battery.

However, in order to receive many electrode assemblies, as described above, it is necessary to increase the depth of an electrode assembly reception unit formed in the aluminum laminate sheet corresponding to a pouch film. In general, the aluminum laminate sheet includes an outer coating layer made of polyethylene terephthalate or oriented nylon film, a metal barrier layer made of aluminum, copper, silver, or gold, and an inner adhesive layer made of polypropylene, whereby the aluminum laminate sheet exhibits stretchability to some extent. However, the greater the depth of the electrode assembly reception unit, the easier the electrode assembly reception unit is damaged by external impact, due to characteristics of the material. In the case in which the depth of the electrode assembly reception unit is a predetermined depth or more, a specific region of the metal barrier layer may be weakened or damaged due to a necking phenomenon at the time of shaping.

FIG. 1 is a conceptual view showing that a limit depth when a pouch film is shaped using a conventional pouch film shaping apparatus is derived through simulation analysis.

The conventional pouch film shaping apparatus includes a supply unit configured to supply a pouch film including a metal barrier layer and a shaping unit configured to shape the pouch film. However, the conventional pouch film shaping apparatus includes no separate preheating unit.

FIG. 1 shows the simulation results of a forming limit using a shaping limit line calculation method proposed by Hecker. At the time of simulation, the case was assumed in which the initial thickness of a pouch film was set to 153 μm, the pouch film was fixed, and a shaping depth was increased using a force of about 1.5 tons until a local neck 120 was generated.

It can be seen from the simulation results that, as the depth of a reception unit formed by shaping is increased (see FIGS. 1(a) to 1(c)), the distortion extent FLD CRT of an outer part of the reception unit increases. It can be seen from FIG. 1 that, when the depth of the reception unit is 5.8 mm as the result of simulation, the local neck 120 is generated.

FIG. 2 is a photograph showing a pouch film portion broken when a pouch film is shaped through the conventional pouch film shaping apparatus.

FIG. 2 shows result values obtained by measuring the thickness of the conventional pouch film at five points, i.e. point 1 to point 5, twice.

It can be seen from FIG. 2 that, in the case in which a reception unit is formed in the pouch film so as to have a large depth, aluminum of a specific stretching portion is not stretched but is broken. In general, a metal barrier layer, among a plurality of layers constituting the pouch film, is a portion that has a high possibility of damage at the time of stretching. Consequently, it is preferable that stretching force of the metal barrier layer be increased in order to reduce damage to the pouch film.

In connection therewith, Patent Document 1 discloses a method of separately forming a layer including a silicone-based resin and microfiber in a pouch film to increase stretching force of the entire pouch film. In this case, however, the thickness of the pouch film is increased, whereby it is difficult to obtain a high-capacity, high-density battery and it is not possible to increase stretching force of a metal barrier layer of the pouch film.

Patent Document 2 discloses a preheating unit located ahead of a supply unit, wherein the preheating unit is formed so as to have a chamber structure and is configured to apply hot air to a raw pouch material. In this case, however, the hot air is applied to an outer coating layer of a pouch film, whereby a metal barrier layer is not heated, and therefore stretching force of the metal barrier layer is not increased. Even though the metal barrier layer is also heated by the hot air, a hot air application time is lengthened in order to obtain sufficient stretching force, whereby the pouch film may be damaged. Furthermore, it is not possible to rapidly and accurately preheat only a necessary portion, whereby energy consumption is also high.

In the case in which temperature is increased in order to heat the metal barrier layer using the hot air, polypropylene particles applied in order to reduce surface frictional force generated on the pouch film at the time of forming the pouch film may melt. Also, even in the case in which air blowing intensity is increased in order to uniformly heat a large area, the polypropylene particles may be blown by the blown air and removed. For a pouch film having no polypropylene particles applied to the surface thereof, surface frictional force of the pouch film is increased, whereby uniform forming is not performed, and a wrinkle and bleaching phenomenon may occur at corners of an electrode assembly reception unit, and cracks may be generated in the case in which the wrinkle and bleaching phenomenon becomes serious.

Therefore, there is a necessity for a pouch film shaping apparatus and method capable of manufacturing a thinner pouch film having a deeper pouch reception unit while reducing breakage of the pouch film at the time of shaping the pouch film.

PRIOR ART DOCUMENTS

Patent Documents (Patent Document 1) Korean Patent Application Publication No. 2018-0060697 (2018.06.07)

(Patent Document 2) Korean Registered Patent Publication No. 10-1587554 (2016.01.15)

DISCLOSURE

Technical Problem

The present invention has been made in view of the above problems, and it is an object of the present invention to provide a pouch film shaping apparatus and method capable of increasing stretching force of a metal barrier layer of a pouch film using a preheating lamp configured to preheat the metal barrier layer of the pouch film, whereby it is possible to reduce damage to and defects in the pouch film.

It is another object of the present invention to provide a pouch film shaping apparatus and method capable of shaping a reception unit of a pouch film so as to have a depth greater than the depth of a conventional reception unit.

Technical Solution

In order to accomplish the above objects, a pouch film shaping apparatus according to the present invention includes a supply unit configured to supply a pouch film including a metal barrier layer, a preheating lamp configured to preheat the metal barrier layer of the pouch film, and a shaping unit configured to shape the pouch film.

The preheating lamp may use mid-infrared light. The mid-infrared light may have a wavelength range of 2 μm to 4 μm.

The metal barrier layer may be made of aluminum.

The preheating lamp may preheat the pouch film to 40° C. to 70° C.

A preheating region of the preheating lamp may include a pouch cup formation portion of the pouch film.

The preheating lamp may be located ahead of the shaping unit in an advancing direction.

The present invention provides a pouch-shaped secondary battery including a pouch film shaped by the pouch film shaping apparatus.

The present invention provides a battery pack including the pouch-shaped secondary battery.

The present invention provides a pouch film shaping method including (S1) supplying a pouch film, (S2) preheating a pouch cup formation portion of the supplied pouch film, and (S3) shaping the preheated pouch cup formation portion.

The preheating in step (S2) may be performed through a mid-infrared lamp.

The mid-infrared lamp may use mid-infrared light having a wavelength range of 2 μm to 4 μm.

In step (S2), the pouch cup formation portion may be preheated to 40° C. to 70°.

The pouch film may include a metal barrier layer, and in step (S2), the metal barrier layer may be preheated.

The metal barrier layer may be made of aluminum.

In the present invention, one or more constructions that do not conflict with each other may be selected and combined from among the above constructions.

DESCRIPTION OF DRAWINGS

FIG. 1 is a conceptual view showing that a limit depth when a pouch film is shaped using a conventional pouch film shaping apparatus is derived through simulation analysis.

FIG. 2 is a photograph showing a pouch film portion broken when a pouch film is shaped through the conventional pouch film shaping apparatus.

FIG. 3 is a conceptual view of a pouch film shaping apparatus according to the present invention.

FIG. 4 is a plan view of a pouch film showing a preheating region that is preheated by the pouch film shaping apparatus according to the present invention.

FIG. 5 is a photograph showing the external appearances of pouch reception units formed by pouch film shaping apparatuses according to Comparative Example 1 and Example 1.

FIG. 6 is a graph showing the thicknesses of metal barrier layers of pouches formed by pouch film shaping apparatuses according to Comparative Example 1 and Examples 2 and 3.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a pouch film shaping apparatus and method according to the present invention will be described in detail with reference to the accompanying drawings.

FIG. 3 is a conceptual view of a pouch film shaping apparatus according to the present invention. The pouch film shaping apparatus according to the present invention includes a supply unit 200 configured to supply a pouch film 100 including a metal barrier layer, a preheating lamp 500 configured to preheat the metal barrier layer of the pouch film, and a shaping unit 600 configured to shape the pouch film.

In the pouch film shaping apparatus, as shown in FIG. 3, a cutting unit 300 configured to cut the pouch film to a desired size and a foreign matter removal unit 400 configured to suction or remove foreign matter that may be generated at the time of cutting the pouch film may be further disposed between the supply unit 200 and the preheating lamp 500. Alternatively, the cutting unit 300 and the foreign matter removal unit 400 may further be disposed behind the shaping unit 600. In consideration of the fact that a change in shape may occur after cutting, the cutting unit 300 and the foreign matter removal unit 400 are preferably located between the supply unit 200 and the preheating lamp 500. At this time, the foreign matter removal unit 400 may move foreign matter to a place other than the pouch film, whereby it is possible to reduce a defect rate at the time of shaping the pouch film. Alternatively, the foreign matter removal unit 400 may suction foreign matter in order to remove the foreign matter from the pouch film. The movement and the suction may be performed at once.

In general, a pouch film includes an outer coating layer, which constitutes the outermost part thereof, a metal barrier layer configured to prevent penetration of matter, and an inner sealant layer for sealing.

The outer coating layer serves to protect a battery from the outside, and therefore high tensile strength compared to the thickness thereof and weather resistance are required. The outer coating layer is mainly made of a polymer, such as oriented nylon film or polyethylene terephthalate (PET). However, the present invention is not limited thereto.

The metal barrier layer serves to prevent air or moisture from being introduced into the battery. The material for the metal barrier layer is not particularly restricted as long as the material exhibits high shapeability and ductility. For example, the metal barrier layer may be made of aluminum or an aluminum alloy.

The inner sealant layer serves to provide sealability as the result of being mutually thermally fused by heat and pressure that are applied in the state in which an electrode assembly is mounted therein, and is mainly made of cast polypropylene (CPP) film. An adhesive layer may be added between the outer coating layer and the metal barrier layer and/or between the metal barrier layer and the inner sealant layer. The adhesive layer serves to supplement low adhesive force between the layers located at opposite surfaces of the adhesive layer.

The supply unit 200 serves to supply a pouch film to the pouch film shaping apparatus. The supply unit 200 serves to supply the pouch film so as to be easily shaped, and needs not necessarily have the form shown in FIG. 3. The supply unit 200 may be configured in the form of a roll or a rail. The supply speed and the supply direction of the supply unit, whether to supply the pouch film from the supply unit, and the like are decided by a controller connected to the supply unit.

The preheating lamp performs preheating in a mode in which light radiated from the lamp directly preheats the pouch film. The reason for this is that, in the case in which the pouch film is indirectly preheated, long time is required and efficiency is low.

The preheating lamp 500 rapidly and accurately preheats the metal barrier layer using mid-infrared light. The mid-infrared light may have a wavelength range of 2 μm to 4 μm, which is a wavelength range within which aluminum in the metal barrier layer is rapidly preheated while the outer coating layer of the pouch film is not damaged.

The pouch film is prepared so as to have a size of 200 mm×500 mm. Subsequently, the pouch film is preheated by the preheating lamp for 4 seconds until the temperature of the pouch film reaches 40° C. to 70° C. such that the preheated pouch film may be shaped by the shaping unit. In the case in which the pouch film is preheated to a temperature higher than 70° C., the outer coating layer of the pouch film may be damaged or the inner sealant layer of the pouch film may melt. In the case in which the preheating temperature is lower than 40° C., the metal barrier layer of the pouch film may not be heated, whereby desired stretching force may not be obtained. Also, in the case in which the pouch film is preheated for a time longer than 4 seconds using the preheating lamp, the pouch film may be damaged. In the case in which the pouch film is preheated for a time shorter than 1 second, the metal barrier layer of the pouch film may not be heated, whereby desired stretching force may not be obtained. The temperature of the pouch film is not limited to the temperature range defined above as long as the components of the pouch film are not deformed or damaged.

The preheating lamp may preheat only a portion of the pouch film, rather than the entirety of the pouch film. FIG. 4 is a plan view of a pouch film showing a preheating region 510 that is preheated by the pouch film shaping apparatus according to the present invention, which shows that the preheating region 510 preheated by the preheating lamp includes a pouch cup formation portion 110 of the pouch film. In addition, the preheating region 510 may have an area equivalent to 100% to 120% of the area of the pouch cup formation portion 110. The reason for this is that only the region of the metal barrier layer that may be damaged due to distortion occurring at the time of pouch shaping is preheated, whereby it is possible to prevent deformation of and damage to other regions and to more easily fix the regions. Preheating may be performed only within a specific range, whereby the process may be simplified and time may be shortened. In addition, since light is radiated for preheating, heat may be uniformly transmitted. In FIG. 34, the range of the pouch cup formation portion 110 is shown as the entire region in which a cup is formed and is shown as being entirely preheated. Alternatively, the pouch film shaping apparatus according to the present invention may use a method of preheating only a region actually extended by the shaping apparatus.

The preheating lamp 500 may be located ahead of the shaping unit 600 in the advancing direction. The preheating lamp 500 may be located spaced apart from the shaping unit 600 by 20 mm to 40 cm. Since preheating is performed at a distance of 20 mm to 40 cm from the shaping unit in the advancing direction, the preheated pouch film may be directly provided to the shaping unit 600. In addition, since the pouch film is shaped in the state in which stretching force thereof is increased, breakage of the pouch film that may occur at the time of shaping may be prevented and a deeper reception unit may be formed.

This can be seen from the experimental results of Example 1, in which a metal barrier layer of a pouch film was preheated using mid-infrared light having a wavelength of 2 μm and then a reception unit was shaped, and Comparative Example 1, in which a reception unit was shaped without preheating a metal barrier layer of a pouch film.

Experimental Example 1

In Example 1 and Comparative Example 1, pouch films, each including an outer coating layer made of PET having a thickness of 20 μm, a metal barrier layer made of aluminum having a thickness of 40 μm, and an inner sealant layer made of cast polypropylene film having a thickness of 20 μm, were tested.

Also, in Example 1 and Comparative Example 1, the shaping unit was constituted by a die and a punch, and pressing was performed using a weight of about 1.5 tons to shape two reception units.

The above process was performed 25 times to acquire crack occurrence probability, which is shown in Table 1.

TABLE 1

| Shaping depth (mm) | 5.775 | 7.0 | 8.0 |
| --- | --- | --- | --- |
| Comparative Example 1 | 0 | 0 | 20% |
| Example 1 | 0 | 0 | 0 |

It can be seen from Table 1 above that, in the case in which the shaping depth is not large no crack occurs in both Example 1 and Comparative Example 1, but in the case in which shaping is performed up to 8.0 mm, cracks occur in Comparative Example 1.

FIG. 5 is a photograph showing the external appearances of pouch reception units formed by pouch film shaping apparatuses according to Comparative Example 1 and Example 1. It can be seen from FIG. 5 that, in Example 1 (b), the pouch film can be uniformly stretched using mid-infrared light, whereby a uniformly shaped reception unit is obtained, but in Comparative Example 1 (a), stretching force is low and stretching extent varies depending on regions, whereby many wrinkles are formed.

Experimental Example 2

In Comparative Example 1 described above, Example 2, in which a pouch film was shaped after being heated up to 60° C. using mid-infrared light having a wavelength of 2 μm, and Example 3, in which a pouch film was shaped after being heated up to 80° C. using mid-infrared light having a wavelength of 2 μm, region-based aluminum residual thicknesses were measured.

In Example 2, Example 3, and Comparative Example 1, pouch films, each including an outer coating layer made of PET having a thickness of 20 μm, a metal barrier layer made of aluminum having a thickness of 40 μm, and an inner sealant layer made of cast polypropylene film having a thickness of 20 μm, were tested.

Also, in Example 2, Example 3, and Comparative Example 1, the shaping unit was constituted by a die and a punch, and pressing was performed using a weight of about 1.5 tons to shape two reception units.

In Example 2, Example 3, and Comparative Example 1, the thicknesses of a corner portion ① of the bottom surface of each reception unit, a side portion ② of the reception unit, and a contact point ③ between a pouch wing and the reception unit, which are regions at which breakage mainly occurs, were measured. FIG. 6 is a graph showing the thicknesses of metal barrier layers of pouches formed by pouch film shaping apparatuses according to Comparative Example 1 and Examples 2 and 3. The horizontal axis of the graph indicates the respective points ①, ②, and ③, and the vertical axis of the graph indicates the thickness (μm) of the metal barrier layer. Also, in this graph, REF indicates Comparative Example 1, 60° C. indicates Example 2, and 80° C. indicates Example 3.

It can be seen from FIG. 6 that the thickness of the metal barrier layer is gradually reduced toward the bottom surface of the reception unit. Also, it can be seen that Examples 2 and 3, in each of which the pouch film was preheated before shaping, have thicker metal barrier layers than Comparative Example 1. It can be seen that, in the case in which shaping is performed after preheating, the elongation of aluminum in the metal barrier layer is high, whereby breakage strength is increased, whereas in the case in which no preheating is performed before shaping, aluminum in a specific stretching portion to which great force is applied is broken, rather than being stretched.

It can be seen from FIG. 6 that the temperature in Example 3 is higher than the temperature in Example 2 but the aluminum residual amount in Example 2, in which shaping was performed after preheating at a temperature lower than the temperature in Example 3, is greater than the aluminum residual amount in Example 3. That is, it can be seen that, in the case in which shaping is performed at an excessively high temperature, elongation is rather excessively high, whereby the effect of preventing breakage of the pouch film is reduced. Consequently, it is preferable that only a necessary specific region of the pouch film be preheated to 40° C. to 70° C.

Although the present invention has been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS

100: Pouch film
110: Pouch cup formation portion
120: Local neck
200: Supply unit
300: Cutting unit
400: Foreign matter removal unit
500: Preheating lamp
510: Preheating region
600: Shaping unit
①: Corner portion of bottom surface of reception unit
②: Side portion of reception unit
③: Contact point between pouch wing and reception unit

INDUSTRIAL APPLICABILITY

A pouch film shaping apparatus and method according to the present invention are capable of preheating a metal barrier layer in order to increase stretching force of a pouch film, whereby it is possible to reduce damage to and defects in the pouch film. Since the metal barrier layer is preheated to increase stretching force of the pouch film, it is possible to form a deeper reception unit than a conventional reception unit.

Since mid-infrared light is used, only a necessary region of the pouch film is rapidly and accurately preheated, whereby it is possible to increase stretching force of the pouch film and to reduce damage to the pouch film due to heat. In addition, since only the necessary region of the pouch film is rapidly and accurately preheated, processing time may not be lengthened, and energy consumption may also be reduced.

Furthermore, a mid-infrared light irradiation unit does not occupy a large space, whereby it is possible to prevent an increase in size of the pouch film shaping apparatus.

Since it is not necessary to use a thick pouch film in order to more deeply form a reception unit of the pouch film, it is possible to form a high-capacity, high-density pouch-shaped secondary battery.

The invention claimed is:

1. A pouch film shaping apparatus comprising:

a supply unit configured to supply a pouch film comprising an outer coating layer including a polymer, an inner sealant layer including polypropylene, and a metal barrier layer disposed between the outer coating layer and the inner sealant layer;

a preheating lamp configured to use mid-infrared light having a wavelength range of 2 μm to 4 μm to directly preheat a pouch cup formation portion of the metal barrier layer for 1 to 4 seconds and thereby to preheat the pouch film to 40° C. to 70° C. while preventing damage to the outer coating layer; and a shaping unit configured to shape the pouch cup formation portion of the metal barrier layer by stretching, the preheating lamp being disposed prior to an entrance of the shaping unit, wherein the preheating lamp is configured to preheat only an area equivalent to 100% to 120% of the area of the pouch cup formation portion, and wherein the preheating lamp is located ahead of the shaping unit in the advancing direction, spaced apart from the shaping unit by 20 mm to 40 cm.

2. The pouch film shaping apparatus according to claim 1, wherein the metal barrier layer is made of aluminum.

3. The pouch film shaping apparatus according to claim 1, wherein the preheating lamp is located before the shaping unit in an advancing direction of the pouch film shaping apparatus.

4. A pouch-shaped secondary battery comprising a pouch film shaped by the pouch film shaping apparatus according to claim 1.

5. A battery pack comprising the pouch-shaped secondary battery according to claim 4.

6. A pouch film shaping method comprising:

supplying a pouch film to a pouch film shaping apparatus, the pouch film comprising an outer coating layer including a polymer, an inner sealant layer including polypropylene, and a metal barrier layer disposed between the outer coating layer and the inner sealant layer;

directly preheating a pouch cup formation portion of the metal barrier layer for 1 to 4 seconds and thereby preheating the pouch film to 40° C. to 70° C. using a preheating lamp using mid-infrared light having a wavelength range of 2 μm to 4 μm, while preventing damage to the outer coating layer; and shaping the preheated pouch cup formation portion by stretching in a shaping unit, the preheating being before the pouch film enters the shaping unit, wherein the preheating lamp preheats only an area equivalent to 100% to 120% of the area of the pouch cup formation portion, and wherein the preheating lamp is located ahead of the shaping unit in the advancing direction, spaced apart from the shaping unit by 20 mm to 40 cm.

7. The pouch film shaping method according to claim 6, wherein the metal barrier layer is made of aluminum.

* * * * *